United States Patent

Hammond

[11] Patent Number: 6,162,484
[45] Date of Patent: Dec. 19, 2000

[54] METHOD FOR THE PRODUCTION OF A REDUCED CALORIE HONEY COMPOSITION

[75] Inventor: Neal A. Hammond, Baton Rouge, La.

[73] Assignee: T. W. Burleson & Son, Waxahachie, Tex.

[21] Appl. No.: 07/784,891

[22] Filed: Oct. 30, 1991

Related U.S. Application Data

[63] Continuation of application No. 07/557,136, Jul. 23, 1990, abandoned.

[51] Int. Cl.$^7$ .................................................. A23G 3/00
[52] U.S. Cl. ............................................ 426/658; 426/520
[58] Field of Search .................................... 426/658, 442, 426/506, 519, 520

[56] References Cited

U.S. PATENT DOCUMENTS

| | | | |
|---|---|---|---|
| 2,295,274 | 9/1942 | Walker | 426/658 |
| 2,693,420 | 11/1954 | Straub | 426/658 |
| 2,868,847 | 1/1959 | Boyers . | |
| 3,780,185 | 12/1973 | Fields | 426/658 |
| 4,304,768 | 12/1981 | Staub et al. | 426/558 X |
| 4,408,041 | 10/1983 | Hirao et al. | 426/589 X |
| 4,529,608 | 7/1985 | Szejtli et al. | 426/658 |
| 4,532,143 | 7/1985 | Brain et al. | 426/658 |
| 4,681,771 | 7/1987 | Adachi et al. . | |
| 4,859,488 | 8/1989 | Kan et al. . | |

FOREIGN PATENT DOCUMENTS

| | | | |
|---|---|---|---|
| 1923329 | 11/1970 | Germany . | |
| 544 508 | 11/1973 | Germany . | |
| 0186256A | 2/1984 | Japan | 426/658 |
| 3157943A | 12/1986 | Japan | 426/658 |
| 0181751 | 7/1989 | Japan . | |
| 564 315 | 6/1975 | Sweden . | |
| 11544508 | 11/1973 | Switzerland . | |
| 511564315 | 6/1975 | Switzerland . | |

OTHER PUBLICATIONS

American Organization of Analytical Methods (AOAC) Official Methods of Analysis, 1984, Methods No. 31.116 and 31.117.

Cheryan, M., Ultrafiltration Handbook, 1986, pp. 256–258, Technomic Publishing Co., Inc., Lancaster.

*Primary Examiner*—Leslie Wong
*Attorney, Agent, or Firm*—Merchant & Gould P.C.

[57] ABSTRACT

Low-sugar dietetic or diabetic honey compositions and method of production are described. Honey compositions containing approximately less than 25% sugar are produced by extending natural honey with extender molecules selected from oligosaccharides, polyols, and dietary fiber which are not metabolized or are slowly metabolized in the human digestive system.

3 Claims, No Drawings

METHOD FOR THE PRODUCTION OF A REDUCED CALORIE HONEY COMPOSITION

This is a continuation of application Ser. No. 07/557,136 filed on Jul. 23. 1990 now abandoned.

FIELD OF THE INVENTION

This invention relates to a low glucose honey and its method of production.

BACKGROUND OF THE INVENTION

Honey is a natural product derived from the digestive conversion of flower nectar to simple sugars by the common honey bee. Honey is composed of glucose, fructose, water, minerals, organic acids, and a small amount of proteinaceous material.

Natural honey is comprised of multiple nutrients including carbohydrates, proteins, vitamins and minerals. Honey is comprised of approximately 38.5% fructose and 31.0% glucose.

When ingested as a food, the human body metabolizes fructose to produce energy, carbon dioxide, and water independent of the pancreatic hormone, insulin. Glucose in honey is metabolized in a similar manner, however, the metabolism of glucose requires insulin.

Dietetic products are used by persons either desiring to restrict the number of calories they consume, or by persons who because of metabolic problems such as diabetes, need to restrict both caloric intake and the intake of those carbohydrates which require insulin for metabolism.

Caloric intake may be reduced by ingesting fewer calories, by ingesting products which cannot be digested or are only slowly digested by the body and are therefore eliminated, or by ingesting materials which speed up the transit time of food in the digestive systems and therefore eliminate food which would otherwise be absorbed.

Previous attempts to produce a dietetic low-calorie or reduced sugar honey have generally been unsuccessful due to the incompatibility of traditional thickening agents with the high viscosity and high solids content of honey. Such attempts have produced honey product with undesirable characteristics, including products which are stringy, cloudy, slimy or slippery, and have a low viscosity as compared with natural honey.

It would be of great utility to produce a honey composition having a low caloric content or low insulin-dependent sugar content and having none of the undesirable qualities described above.

SUMMARY OF THE INVENTION

A honey composition is provided which is low in total sugar content or low in the content of insulin-dependent sugars as compared with natural honey. The honey compositions of the present invention contain natural honey and approximately 35–50% by weight of an extender molecule which is slowly-metabolized as compared with sugars or non-metabolized in the human digestive system.

The method of the present invention includes mixing natural honey with an extender molecule to produce honey compositions useful as dietetic and diabetic foodstuffs free of the undesirable qualities of ropiness, cloudiness, sliminess, and lowered viscosity, and having color, flavor, texture and viscosity which approximates that of natural honey.

DETAILED DESCRIPTION OF THE INVENTION

The diabetic or dietetic honey compositions of the present invention are comprised of natural honey and a non-metabolizable or slowly-metabolizable extender molecule. The term slowly-metabolizable is meant to include those compounds which are metabolized only slowly in the human digestive system, as compared with sugars such as glucose and fructose. Preferably, the composition of the present invention contains at least 40% by weight of natural honey, and approximately 35% to approximately 50% of an extender molecule. More preferably, the product is comprised of approximately 50% honey and approximately 30% to 40% of an extender molecule.

Natural honey varies in color from water white to dark amber, depending upon its floral source. Any of the known floral honeys may be used to produce the compositions of the present invention.

The extender molecule may be a non-metabolizable oligosaccharide, a slowly-metabolized polyol or polysaccharide, a non-metabolizable dietary fiber, or a mixture thereof. Oligosaccharides useful in the present invention include raffinose and stachyose, sugars which are not metabolized in the human digestive system. Soluble soybean carbohydrate, a neutral aqueous extract of defatted soybean meal, may be utilized as a source of non-metabolizable oligosaccharides, as this extract contains primarily stachyose and raffinose. Preferably, oligosaccharides in the honey composition of the present invention comprises approximately 35% to approximately 50% raffinose ($C_{18}H_{32}O_{15}.5H_{20}$), stachyose ($C_{24}H_{42}O_{21}.4H_{20}$), or polydextrose.

Polydextrose or polyols of 2–6 carbons may be used as extender molecules which are slowly metabolized as compared with sugars. Preferred polyols include mannitol, xylitol, dulcitol, arabinitol, glycerol sorbitol or maltitol. Polyols are preferably present in the honey composition in the range of approximately 35% to approximately 50% polyol. The most preferred polyol for use as an extender molecule is sorbitol, which is slowly metabolized via a non-insulin dependent pathway to yield 4 calories/gram of energy.

Dietary fiber may also be used as a non-metabolizable extender molecule. Suitable sources of dietary fiber include oat bran and other cereal brans, and seed including psyllium seed.

The compositions of the present invention are reduced in sugar, including both glucose and fructose content, as compared with natural honey. Preferably, the compositions contain less than 25% by weight of glucose or fructose, more preferably, less than 15%, and most preferably, less than 5%.

The low-sugar honey compositions of the present invention may be produced by dissolving an extender molecule in water, adding natural honey, and heating to a boil while stirring. The resulting low-sugar honey compositions may be filtered, preferably through a screen of approximately 200 to approximately 600 mesh, or through a 0.2 micron filter. More preferably, the honey may be filtered using an ultrafiltration system. The ultrafiltration system is particularly useful when a dietary fiber is the extender molecule. Ultrafiltration helps to rapidly remove particulates and proteinaceous matter which may be added by the fiber source.

Desirable qualities of a honey composition, including color, viscosity, flavor, and texture may be quantitated using methods known in the art, and approved by the American Honey board. In general, these tests are subjective, and employ a test panel of persons making comparisons to a honey standard. Color may be evaluated as described in the American Organization of Analytical Methods (AOAC) Official Methods of Analysis, 1984. Viscosity may be measured, for example using a viscometer.

The invention is illustrated by way of the following examples.

EXAMPLES

Example 1

Sorbitol-extended Honey Composition

To 195 g of sorbitol was added 55 g of water. This mixture was heated to 120° C., with stirring to dissolve the sorbitol. Light amber honey (250 g) was added to the mixture with stirring, and the mixture (39% Sorbitol) was heated to boiling. The heated mixture was filtered through a 0.2 micron filter and allowed to cool.

The color, viscosity, flavor, and texture of the extended honey composition, approximated that of the original light amber honey. AOAC Methods No. 31.116 and 31.117, AOAC official methods of analysis, were used to determine color of the composition. A viscometer (Brookfield) was used to determine viscosity flavor and texture of the honey composition was determined by a test panel comparing the composition to natural light amber honey.

The above-described procedure was repeated with 35% and 41% sorbitol in the honey composition. The viscosities measured for the 35%, 39%, and 41% sorbitol-extended honey compositions were 5,000, 9,500 and 10,000 cps, respectively.

Example 2

Soy-Extended Honey

In a Waring Blender 100 g of defatted soy flakes (ADM Corp.) were mixed with 500 g of hot water at high speed for ten minutes. Solids were filtered through cheese cloth, and the liquid centrifuged 10 minutes at 2900 RPM. The supernatant were decanted, acidified to pH 4.0 with hydrochloric acid, and again centrifuged 10 minutes at 2900 RPM. The decanted supernatant was passed through a Polysulfone ultrafiltration system with a molecular weight cutoff of 10,000. The clear liquid containing oligosaccharides was then freeze dried.

The freeze-dried material (16 g) was mixed with 4 g of water and heated to boiling. Light amber honey (20 g) was added and heated to boiling. The resulting mixture was then removed filtered through cheese cloth, and cooled.

The color, viscosity, and flavor of the product was determined as described for Example 1, and approximated that of the original light amber honey. The product was slightly cloudy.

Example 3

Dietary Fiber-Extended Honey Composition

In a Waring Blender, 100 g of ground oat bran were mixed with 500 g hot water at high speed for ten minutes. Solids were filtered through cheese cloth and the liquid was centrifuged 10 minutes at 2900 RPM. The supernatant was decanted, acidified to Ph 4.0 with hydrochloric acid, and again centrifuged 10 minutes at 2900 RPM. The decanted liquid was then passed through a polysulfone ultrafiltration system with a molecular weight cutoff of 10,000. The clear liquid containing soluble dietary fiber was freeze dried.

The freeze dried fiber (16 g) was mixed with 4 g of water and heated to boiling. Light amber honey (20 g) was added and again heated to boiling. The resulting mixture was then filtered through a 0.2 micron filter and cooled.

The color, viscosity, flavor, and texture of the resulting honey composition was determined as described for Example 1, and was found to approximated the original light amber honey.

Example 4

Dietary Fiber Source-Psyllium Seed

The method of Example 3 was repeated using 100 g of ground Psyllium seed. The color, viscosity, flavor, and texture of the resulting honey composition was determined as described for Example 1, and was found to approximated the original light amber honey.

Example 5

Polydextrose-Extended Honey Composition

To 195 g of polydextrose was added 55 g of water. This mixture was heated to 120° C. with stirring to dissolve the polydextrose. Light amber honey (250 g) was added to the polydextrose solution with stirring, and the mixture was heated to boiling. The heated mixture was filtered through a 0.2 micron filter and allowed to cool.

The color, viscosity, flavor, and texture of the honey composition was determined as described for Example 1, and was found to approximate the original light amber honey.

The above-described procedure was repeated with polydextose content ranging from 30% to 41% in the final honey composition. The results, as shown in Table 1 indicate approximately 39%–40% polydextrose yields a honey composition having a desired viscosity which approximates that of natural honey.

TABLE I

| % Honey | % Polydextrose | Viscosity (cps) |
|---|---|---|
| 0 | 70 | 700 |
| 50 | 35 | 4500 |
| 50 | 37.5 | 5000 |
| 50 | 39 | 9000 |
| 50 | 40 | 9500 |
| 50 | 41 | 12000 |

The foregoing description of the invention is illustrative and explanatory thereof. Various changes in the materials, apparatus, and particular steps employed will occur to those skilled in the art. It is intended that all such variations within the scope and spirit of the appended claims be embraced thereby.

What is claimed is:

1. A method for the production of a reduced calorie honey composition consisting essentially of:

(a) about 35 to about 65 weight percent of natural honey; and (b) about 35 to 50 weight percent of an extender selected from the group consisting of raffinose, stachyose, sorbitol, mannitol, xylitol, dulcitol and arabinitol, said process comprising the steps of:

(a) dissolving the extender in water to form a solution;
(b) adding pure honey to the solution; and
(c) heating the solution to a boil while stirring;
wherein the honey composition contains less than 25 weight percent glucose and less than 25 weight percent fructose and has a viscosity of about 8,500 to 11,000 centipoise.

2. The method of claim 1 further comprising the step of: filtering the honey composition to remove precipitated material.

3. The method of claim 2 wherein said filtering is through an ultrafiltration system.

* * * * *